United States Patent
Kovacevic

(10) Patent No.: US 7,047,330 B2
(45) Date of Patent: May 16, 2006

(54) SYSTEM FOR DIGITAL STREAM TRANSMISSION AND METHOD THEREOF

(75) Inventor: Branko D. Kovacevic, Willowdale (CA)

(73) Assignee: ATI Technologies, Inc., Thornhill (CA)

( * ) Notice: Subject to any disclaimer, the term of this patent is extended or adjusted under 35 U.S.C. 154(b) by 979 days.

(21) Appl. No.: 09/800,223

(22) Filed: Mar. 6, 2001

(65) Prior Publication Data

US 2002/0178274 A1 Nov. 28, 2002

(51) Int. Cl.
*G06F 3/00* (2006.01)

(52) U.S. Cl. ............................ 710/58; 710/29; 710/52; 710/59; 710/60; 710/61

(58) Field of Classification Search .................. 710/52, 710/53, 54, 55, 56, 57, 58, 60, 29
See application file for complete search history.

(56) References Cited

U.S. PATENT DOCUMENTS

| 5,938,749 | A  | * | 8/1999  | Rusu et al. ..................... 710/54 |
| 6,026,075 | A  | * | 2/2000  | Linville et al. .............. 370/236 |
| 6,490,250 | B1 | * | 12/2002 | Hinchley et al. ............ 370/232 |
| 6,567,409 | B1 | * | 5/2003  | Tozaki et al. ........... 370/395.64 |
| 6,622,182 | B1 | * | 9/2003  | Miller et al. ................... 710/29 |
| 6,636,909 | B1 | * | 10/2003 | Kahn et al. .................... 710/60 |

* cited by examiner

*Primary Examiner*—Kim Huynh
*Assistant Examiner*—Alan S. Chen

(57) ABSTRACT

A system and methods are shown for generating a transport stream. An application reads a transport stream file stored in memory. The application provides access to the transport stream file to a graphics card using a multimedia peripheral port (MPP). The MPP is used to provide data from the transport stream file to a transport stream demultiplexer. The application determines a desired transmission rate from the data present between program clock references in the transport stream file. The application suspends transmissions to the transport stream demultiplexer to allow a transmission bit-rate to match the desired bit-rate. The application also suspends transmission when the receiving transport demultiplexer determines its buffers are nearly full.

10 Claims, 8 Drawing Sheets

| MPP_GP_CONFIG MMR:0x08C8 IND:0x08C8 [RW] 32 bits ||||
|---|---|---|---|
| Field Name | Bits | Default | Description |
| MPP_GP_ALT_REG_EN | 3 | 0x0 | The enable bit for the MPP_ALT_REG mode, for register based streaming into the demux framer. |
| MPP_GP_EN | 31 | 0x0 | 0=Disable MPP; 1=Enable MPP master. |

| MPP_CLK_CNTL MMR:0x0074 IND:0x0074 [RW] 32 bits (access: 32) ||||
|---|---|---|---|
| Field Name | Bits | Default | Description |
| MPP_CLK_FRACTION | 11:0 | 0x0 | Controls the data rate. The higher value it is set to, the faster MPP sends data to TD |
| MPP_BUSRDY_SELECT | 28 | 0x0 | 0 - normal MPP busrdy signal is used; 1 - special MPP busrdy signal is used. This is used to control the rate for MPP sends data to TD |
| MPP_TDTEST_MODE | 29 | 0x0 | 0 - Send data to SAD; 1 - Send data to TD through GPIO bus |
| MPP_TD_PARALLEL | 31 | 0x0 | 0 - send serial stream to TD; 1 - send 8 bit parallel stream to TD |

| MPP_GP_ALT_REG_ADDR MMR:0x0088 IOR:0x0088 IND:0x0088 [RW] 32 bits (access: 8/16/32) ||||
|---|---|---|---|
| Field Name | Bits | Default | Description |
| MPP_GP_ALT_REG_AD | 7:0 | 0x0 | The address of the register that MPP will write/read when MPP is in the ALT_REG mode. Only the lowest byte is used, and no byte write should be done on the upper 3 bytes. |

| MPP_GEN_STATUS MMR:0x008C IOR:0x00F4 IND:0x00F4 [RW] 32 bits (access: 8/16/32) ||||
|---|---|---|---|
| Field Name | Bits | Default | Description |
| MPP_TD_RDY (read) | 0 | 0x0 | 0=MPP_TD_BUS_RDY; 1=MPP_TD_BUS_BUSY |
| MPP_GP_RDY (read) | 1 | 0x0 | 0=MPP_GP_BUS_RDY; 1=MPP_GP_BUS_BUSY |
| MPP_GP_ALT_RDY (read) | 2 | 0x0 | 0=MPP_GP_ALT_BUS_RDY; 1=MPP_GP_ALT_BUS_BUSY |
| MPP_GP_INT_FLAG (read) | 3 | 0x0 | 0=MPP no MPP interrupt;1=MPP interrupt from TD, GP or ALT_GP bus. |

| AMCGPIO_MASK MMR:0x08B0 IND:0x08B0 [RW] 32 bits (access: 8/16/32) ||||
|---|---|---|---|
| Field Name | Bits | Default | Description |
| AMCGPIO_MASK | 31:0 | 0x0 | 0=shared by VIP, MPP,I2C, TD, or I2S bus; 1=GPIO pin only. |

| AMCGPIO_A_REG MMR:0x08B4 IND:0x08B4 [RW] 32 bits (access: 8/16/32) ||||
|---|---|---|---|
| Field Name | Bits | Default | Description |
| AMCGPIO_A | 31:0 | 0x0 | Input from GPIO bus – read status from input pins |

| AMCGPIO_Y_REG MMR:0x08B8 IND:0x08B8 [RW] 32 bits (access: 8/16/32) ||||
|---|---|---|---|
| Field Name | Bits | Default | Description |
| AMCGPIO_Y (R) | 31:0 | 0x0 | Input to GPIO bus – write data to output pins |

| AMCGPIO_EN_REG MMR:0x08BC IND:0x08BC [RW] 32 bits (access: 8/16/32) ||||
|---|---|---|---|
| Field Name | Bits | Default | Description |
| AMCGPIO_EN | 31:0 | 0x0 | 0=input direction.; 1=output direction. |

FIG. 4A

| MPP_GP_CONFIG [RW] 32 bits ||||
|---|---|---|---|
| Field Name | Bits | Default | Description |
| MPP_GP_ALT_REG_EN | 3 | 0x0 | The enable bit for the MPP_ALT_REG mode, for register based streaming into the demux framer. |
| MPP_GP_EN | 31 | 0x0 | 0=Disable MPP; 1=Enable MPP master. |

| MPP_CLK_CNTL [RW] 32 bits (access: 32) ||||
|---|---|---|---|
| Field Name | Bits | Default | Description |
| MPP_CLK_FRACTION | 11:0 | 0x0 | Controls the data rate. The higher value it is set to, the faster MPP sends data to TD |
| MPP_BUSRDY_SELECT | 28 | 0x0 | 0 - normal MPP busrdy signal is used; 1 - special MPP busrdy signal is used. This is used to control the rate for MPP sends data to TD |
| MPP_TDTEST_MODE | 29 | 0x0 | 0 - Send data to SAD; 1 - Send data to TD through GPIO bus |
| MPP_TD_PARALLEL | 31 | 0x0 | 0 - send serial stream to TD; 1 - send 8 bit parallel stream to TD |

| MPP_GP_ALT_REG_ADDR 32 bits (access: 8/16/32) ||||
|---|---|---|---|
| Field Name | Bits | Default | Description |
| MPP_GP_ALT_REG_AD | 7:0 | 0x0 | The address of the register that MPP will write/read when MPP is in the ALT_REG mode. Only the lowest byte is used, and no byte write should be done on the upper 3 bytes. |

| MPP_GEN_STATU [RW] 32 bits (access: 8/16/32) ||||
|---|---|---|---|
| Field Name | Bits | Default | Description |
| MPP_TD_RDY (read) | 0 | 0x0 | 0=MPP_TD_BUS_RDY; 1=MPP_TD_BUS_BUSY |
| MPP_GP_RDY (read) | 1 | 0x0 | 0=MPP_GP_BUS_RDY; 1=MPP_GP_BUS_BUSY |
| MPP_GP_ALT_RDY (read) | 2 | 0x0 | 0=MPP_GP_ALT_BUS_RDY; 1=MPP_GP_ALT_BUS_BUSY |
| MPP_GP_INT_FLAG (read) | 3 | 0x0 | 0=MPP no MPP interrupt;1=MPP interrupt from TD, GP or ALT_GP bus. |

| AMCGPIO_MASK [RW] 32 bits (access: 8/16/32) ||||
|---|---|---|---|
| Field Name | Bits | Default | Description |
| AMCGPIO_MASK | 31:0 | 0x0 | 0=shared by VIP, MPP,I2C, TD, or I2S bus; 1=GPIO pin only. |

| AMCGPIO_A_REG [RW] 32 bits (access: 8/16/32) ||||
|---|---|---|---|
| Field Name | Bits | Default | Description |
| AMCGPIO_A | 31:0 | 0x0 | Input from GPIO bus – read status from input pins |

| AMCGPIO_Y_REG [RW] 32 bits (access: 8/16/32) ||||
|---|---|---|---|
| Field Name | Bits | Default | Description |
| AMCGPIO_Y (R) | 31:0 | 0x0 | Input to GPIO bus – write data to output pins |

| AMCGPIO_EN_REG [RW] 32 bits (access: 8/16/32) ||||
|---|---|---|---|
| Field Name | Bits | Default | Description |
| AMCGPIO_EN | 31:0 | 0x0 | 0=input direction.; 1=output direction. |

FIG. 4B

SYSTEM FOR DIGITAL STREAM TRANSMISSION AND METHOD THEREOF

CO-PENDING APPLICATIONS

This invention is related to co-pending patent application entitled "SYSTEM FOR BIT-RATE CONTROLLED DIGITAL STREAM PLAYBACK AND METHOD THEREOF", which has an application Ser. No. 09/800,226 and filed simultaneously herewith.

1. Field of the Disclosure

The present invention relates generally to processing data streams and more particularly to generating a data stream.

2. Background

Audio and visual components related to compressed MPEG-2 data must be properly synchronized for processing. The precise time to present uncompressed data is generally indeterminate relative to the time when the data is received in compressed form. Program clock references that are given during 'stream time' are transmitted in the adaptation field of audio or visual packets or auxiliary data at least ten times every second. A system may establish a reference of which time data should be given to an auxiliary decoder. A conventional MPEG-2 receiver system processes data from a data stream to synchronize a system clock to the program clock references. The system may then establish a presentation time for a particular data set according to the time the data set is received in reference to other received data sets. Using a stream time determined by the program clock references and a presentation time, which is provided with the data set as a presentation time stamp (PTS), the data set is then passed to decoding components.

A clock local to the decoding system, a system time clock (STC), is used to provide the reference time to compare to the PTS values. The STC is a counter, or clock reference, maintained by the receiving (decoder) system. By comparing the values of the PTS to the system time clock and rendering the data associated with a particular PTS when a match occurs, a decoder may obtain synchronized presentation of audio and visual data. The STC must be properly synchronized to the clock of the encoding system to properly present the data. Program clock reference (PCR) values are occasionally provided within the transport stream. The STC can set itself to the PCR values to synchronize to the encoding system.

Broadcasters must maintain specific timing relationships between packets of transmitted data to meet particular broadcast video specifications, such as those related to the MPEG specification. A re-broadcaster attempting to broadcast video programs recorded from an original broadcast is burdened with maintaining the timing relationships according to the particular broadcast video specification. The re-broadcaster must maintain the timing associated with the original broadcast. Furthermore, a broadcaster must also keep in mind the properties of a receiving system. The properties of the receiving system determine the amount of time the receiving system has to receive and process data sent by the broadcaster. If the receiving system is unable to process data fast enough, receiving data buffers may overflow and data is lost.

Conventional systems use a transport stream generator to generate transport streams needed for digital recording or playback systems. The transport stream generators are dedicated systems for providing a transport stream from stored files. However, the transport stream generators use dedicated operating systems and file systems. The transport stream generators use dedicated functionality to provide a transport stream at a dedicated bit-rate. However, the transport stream generators are expensive and require dedicated system and hardware to run properly. From the discussion above, it is apparent that a cost effective system for providing transport stream generation is needed.

BRIEF DESCRIPTION OF THE DRAWINGS

Specific embodiments of the present invention are shown and described in the drawings presented herein. Various objects, advantages, features and characteristics of the present invention, as well as methods, operation and functions of related elements of structure, and the combination of parts and economies of manufacture, will become apparent upon consideration of the following description and claims with reference to the accompanying drawings, all of which form a part of this specification, and wherein:

FIG. 4 is a set of tables illustrating various registers associated with the multimedia peripheral port according to one embodiment of the present invention;

DETAILED DESCRIPTION OF THE FIGURES

At least one embodiment of the present invention provides for a method of generating a bit-rate controlled transport stream. The method includes reading data related to a transport stream from a file. The method includes setting a transmit bit-rate to a first bit rate and sending a representation of the data at the transmit bit-rate to a transport stream demultiplexer. The demultiplexer is used to process the data as a transport stream. The method also includes determining the number of bits between program clock references embedded within the transport stream. The method includes determining a desired elapsed time between the program clock references. The method further includes determining a desired bit-rate based on the number of bits and the desired elapsed time and adjusting the transmit bit-rate to match the desired bit-rate. An advantage of at least one embodiment of the present invention is that by providing a cost-effective solution for transport stream generation, equipment costs may be reduced.

Figure 1:
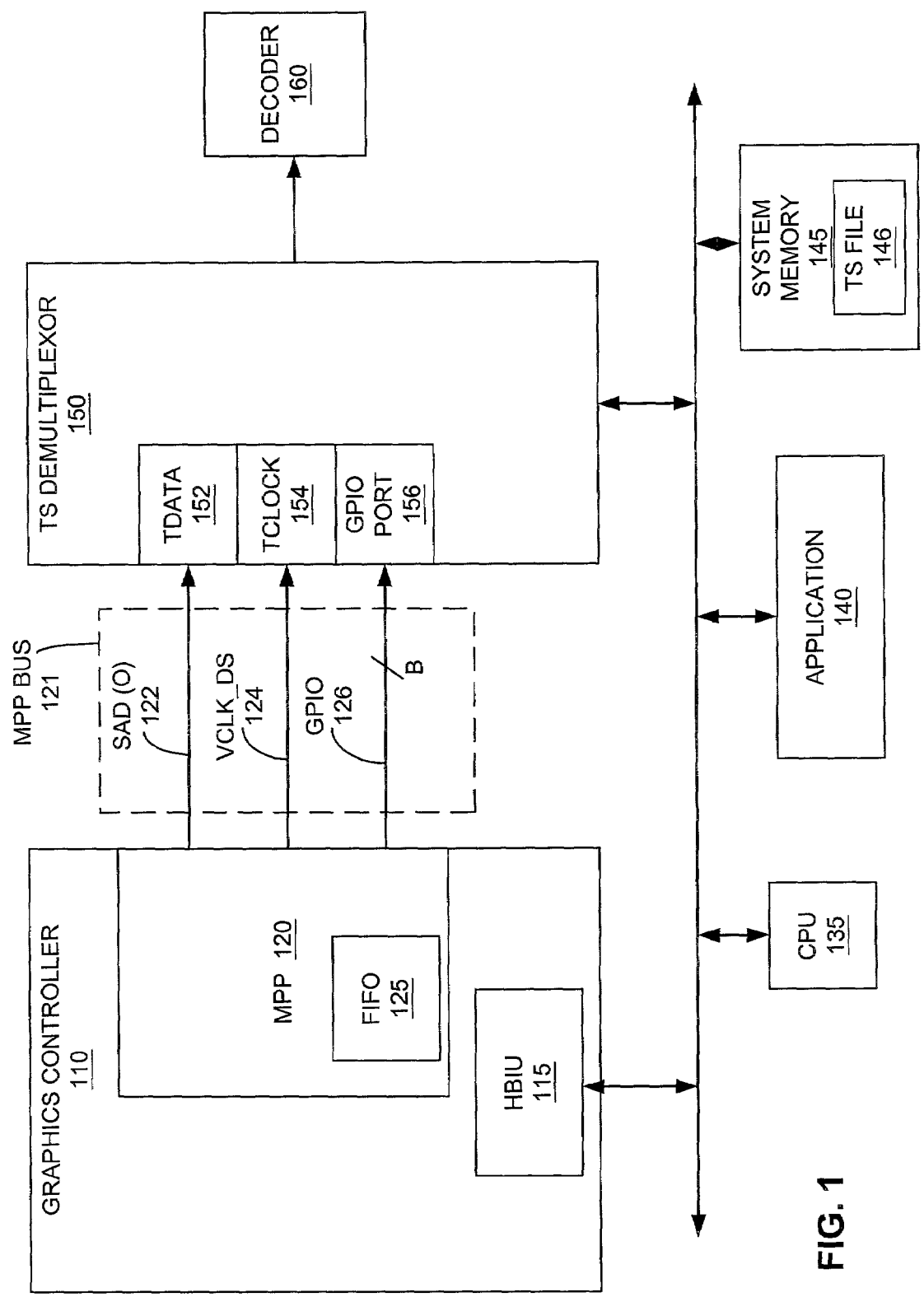
FIG. 1 is a block diagram illustrating a system for generating a transport stream for a transport stream demultiplexer, according to one embodiment of the present invention.

Referring now to FIG. 1, a block diagram illustrating a system for generating transport streams from a file is shown, according to one embodiment of the present invention. A transport stream (TS) file 146 is read from system memory 145. The data related to TS file 146 is processed through a graphics controller 110 and is sent through a multimedia peripheral port (MPP) 120. A TS demultiplexer 150 receives data related to TS file 146 through an MPP bus 121. Multimedia data processed by TS demultiplexer 150 is decoded through decoder 160.

In one embodiment application 140 is used facilitate the transfer of data from the TS file 146 to the graphics controller 110. This can be accomplished by configuring registers to facilitate a bus master transfer of the data in TS file 146 to the graphics controller 110. In addition, the application 140 can monitor the transmission of data through MPP 120. In one embodiment, a user of the application 140 a specific TS file, such as TS file 146, from system memory 145 to be processed through TS demultiplexer 150. In one embodiment, application 140 determines a bit-rate for transmitting data related to TS file 146 through MPP 120 in graphics controller 110. The data is transmitted at the selected data rate to the TS demultiplexer 150 for further processing. In one embodiment, processing the data includes processing the data into transport stream packets and into elementary stream multimedia data.

In one embodiment, application 140 uses program clock reference (PCR) values within the accessed data to determine a desired bit-rate of the data for transmission to TS demultiplexer 150. The desired bit-rate can be calculated by taking the number of bits of data transferred between PCR values, and dividing this number of bits by the difference between the PCR values. Note, the processes of counting the number of bits transferred, as well as the determining the PCR values and the difference between them can be performed by the application, the TS demultiplexer 150, or by a combination of the two. For example, the demultiplexer can specifically parse the transport stream for PCR values based on register data. The application 140 can used these parsed values to determine the desired bit-rate. In another embodiment, the application can parse saved data for PCR values to determine the bit-rate.

As data is sent through MPP 120, the average transmission bit-rate can be monitored to determine whether any adjustments need to be made to control the transmission bit-rate. In one embodiment, to adjust the transmission bit-rate, application 140 suspends the transmission of data for a specific time to allow an average of the transmission bit-rate to more closely match the desired bit-rate. In one embodiment, application 140 requests the time before and after transmitting a portion of the data related to TS file 146 to calculate the transmission bit-rate. In one embodiment, application 140 must analyze data related to a program association table (PAT) or a program map table (PMT) to identify a first program stream that includes a PCR value.

Alternatively, receive buffers (not shown) within TS demultiplexer 150 may become close to being full resulting in a request for a slower bit-rate, in which application 140 may suspend transmission to allow the receiving system, such as TS demultiplexer 150, time to process the current data. In one embodiment, TS demultiplexer 150 provides an indicator once its FIFOs are greater than 90 percent capacity. In one embodiment, TS demultiplexer 150 sends a signal or an interrupt to the application or the graphics controller 110 to indicate buffer overflow trend. In another embodiment, the TS demultiplexer 150 provides a value to a hardware register which is monitored by application 140, or graphics controller 110 to determine the fullness of the receive buffers. In one embodiment, application 140 is a stored in system memory 145, and CPU 135 is used to process the instructions associated with the application 140. CPU 135 may also be used to run components of hardware controller 110, TS demultiplexer 150 and decoder 160.

In one embodiment, graphics controller 110 accesses data related to TS file 146, through a host bus interface unit (HBIU 115) coupled to a system bus, such as peripheral component interconnect (PCI) bus 130. The data is transferred to a first-in-first-out (FIFO) buffer 125 for controlled transmission to TS demultiplexer 150. MPP 120 represents a port interface for graphics controller 110 to provide control of transmission over an MPP bus 121. MPP 120 is optimized for transfer of multimedia data. Alternate embodiments of an MPP port, such as MPP 120, are provided in greater detail later in this document. MPP 120 transfers data in FIFO buffer 125 over MPP bus 121. In one embodiment, MPP bus 121 includes an address bus (SAD) that includes a line labelled SAD(0) 122 for providing serial transmission of the data. A clock signal related to the data transferred over SAD(0) 122 is provided over a node labelled VCLK_DS 124. Data may also be simultaneously provided in a parallel manner by general purpose I/O (GPIO) portion 126 of the MPP Bus 121. In one embodiment, the data can be transferred over eight parallel lines of data portion of MPP bus, lines SAD[7:0] instead in a serial fashion that uses line SAD0. Data over lines 122, 124, and 126, of bus 121, is received through TDATA port 152, TCLOCK port 124, and GPIO port 126, respectively. In one embodiment, MPP 120 is a part of graphics controller 110. In an alternate embodiment, MPP 120 is interfaced externally to graphics controller 110.

Demultiplexer 150 processes the data received through ports 152–156. The data is processed into transport stream packets and elementary streams. One example of a demultiplexer is described in copending patent application Ser. No. 09/490,350, which is hereby incorporated herein by reference. The demultiplexer can include a data parser which selects portions of the data are selected for processing. Portions of the selected data may be stored in memory, such as system memory 145, through PCI bus 130. In addition, portions of selected data may also be decoded through decoder 160. In one embodiment the selected data is associated with video data to be displayed. In another embodiment, the selected data is associated with audio data to be played using an audio receiver or audio speaker system.

Figure 2:
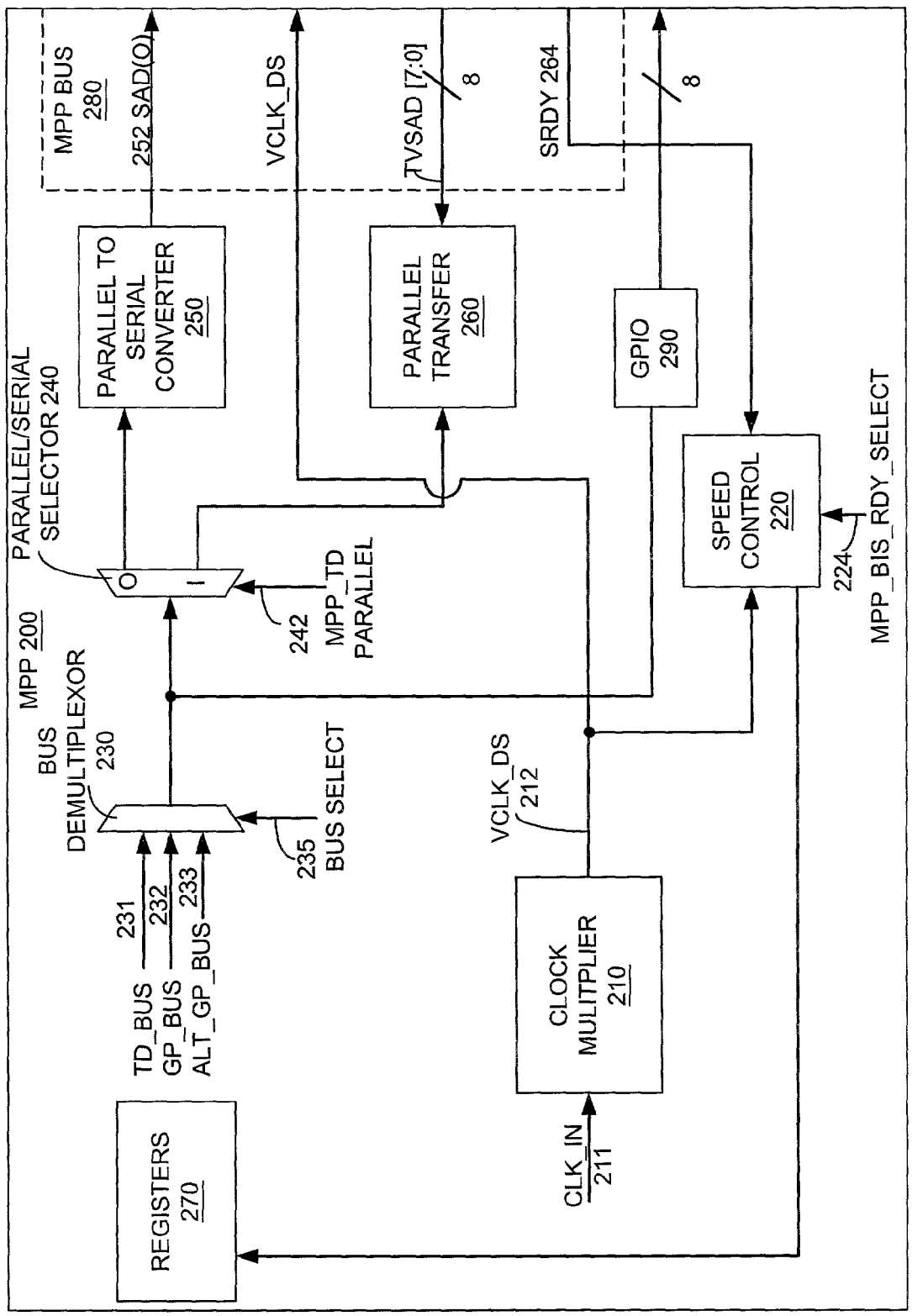
FIG. 2 is a block diagram illustrating internal components of a multimedia peripheral port controller, according to one embodiment of the present invention.

Referring now to FIG. 2, a block diagram illustrating portions of an MPP port 200 is shown, according to one embodiment of the present invention. Settings within MPP port 200 are used to configure options for presenting data over lines 212, 252, 262, and 264, which may be used as part of an MPP bus 280. MPP bus 280 may be coupled to an external peripheral, such as a transport stream demultiplexer, to provide multimedia data.

In one embodiment, MPP port 200 is connected to a variety of peripherals. Respective busses coupled to MPP bus 280 may identify the data related to the various peripherals. For example, in one embodiment, data related to a TS demultiplexer bus, is stored as TD_BUS data 231.

Another set of data, related to a general-purpose bus, is stored as GP_BUS data 132. Data related to an alternate general purpose bus is stored as ALT_GP_BUS data 233. In one embodiment, the various peripherals to receive data are selected from the sets of data 231–233, through a BUS_SELECT indicator 235. Using the peripheral bus determined by BUS_SELECT indicator 235, bus demultiplexer 230 selects one of the sets of data 231–233. Specific peripherals connected to the MPP bus can be selected by providing an address value over the address lines (SAD(0:7) of MPP BUS during an initial handshaking procedure.

The data selected through bus demultiplexer 230 is then sent through a parallel/serial selector 240. Parallel/serial selector 240 uses an indicator, such as MPP_TD_PARALLEL indicator 242. MPP_TD_PARALLEL indicator 242 is used to select whether the data is to be sent in serial or in parallel. In one embodiment, if MPP_TD_PARALLEL indicator 242 indicates serial transmission (such as with a logic '0' value), parallel/serial selector 240, directs the data to a parallel to serial converter, 250. In one embodiment, the parallel to serial converter 250 simply shifts the parallel data presented through parallel/serial selector 240 into a serial bit-stream. The serial bit-stream is provided through a single line of the MPP port, such as the SAD(0) line 252 of the full address bus (not illustrated). It should be appreciated that other lines of MPP bus 280 may be used to transfer the serial bit-stream. In one embodiment, a clock signal is also provided, such as clock signal VCLK_DS 212, to providing timing information relative to data transmitted over SAD(0).

In one embodiment, clock signal, VCLK_DS is a function of another clock signal, CLK_IN 211. CLOCK_IN 211 may be provided through an external source or a connected oscillator used to provide a stable clock source. A clock multiplier 210is used to provide a multiplication of CLK_IN 211 to generate VCLK_DS 212. Accordingly, various fractions may be programmed into MPP port 200 to control a fraction of CLK_IN 211 to be represented in VCLC_DS 212. Clock multiplier 2110 allows VCLK_DS 212 to provide a clock rate different from CLK_IN 211, however synchronized to CLK_IN 211 to provide a stable clock-rate. In one embodiment, the speed control portion 220 is programmed with a value based on the desired bit-rate previously calculated to provide the data at the desired bit-rate.

If MPP_TD_PARALLEL indicator 242 selects parallel transmission, parallel/serial selector 240 will pass the parallel data from bus demultiplexer 230 to a parallel transfer component 260. Parallel transfer component 260 prepares the parallel data to be transferred over GPIO lines 262. In one embodiment, the parallel data is prepared to match a transmission protocol. An SRDY signal 264 may be provided from the receiver to transmitter to indicate when data is ready to be accepted. In one embodiment, SRDY signal 264 is determined through an SREADY control component 220. SREADY control component 220 uses VCLK_DS 212 and an MPP_BUS_RDY_SELECT indicator 224, to determine when to sample SRDY signal 264. This provides hardware flow control.

In one embodiment, indicators 224, 235 and 242 represent field values associated with sets of registers 270. The registers 270 may be set by MPP port 200, or by an application program, such as application program 140 (FIG. 1). More detail related to various registers of registers 270 is provided in reference to FIG. 4. In one embodiment, the data prepared for transmission over MPP bus 280 is sent to a TS demultiplexer, for processing as described further in reference to FIG. 3. In the illustrated embodiment, serial data is transmitted over SAD(0) line 252 and parallel data is sent over GPIO lines 262. In an alternate embodiment, serial data may be sent over a single line of GPIO lined 262. Accordingly, parallel data may also be sent over sets of SAD lines (not shown), of which SAD(0) line 252 is a single line.

In one embodiment, a television output (TVO) component 290 is included in MPP port 200. TVO component 290 may be used to provide video information to a compliant TVO display that includes an input port coupled to the MPP bus 280. In one embodiment, TVO component 290 generates video data related to an application program, other than application 140. In one embodiment, the TVO video data is configured for transmission over the address bus (SAD) of MPP bus 280. The compliant TVO display is coupled to the MPP bus 280 and is capable of processing the data for display.

Figure 3:
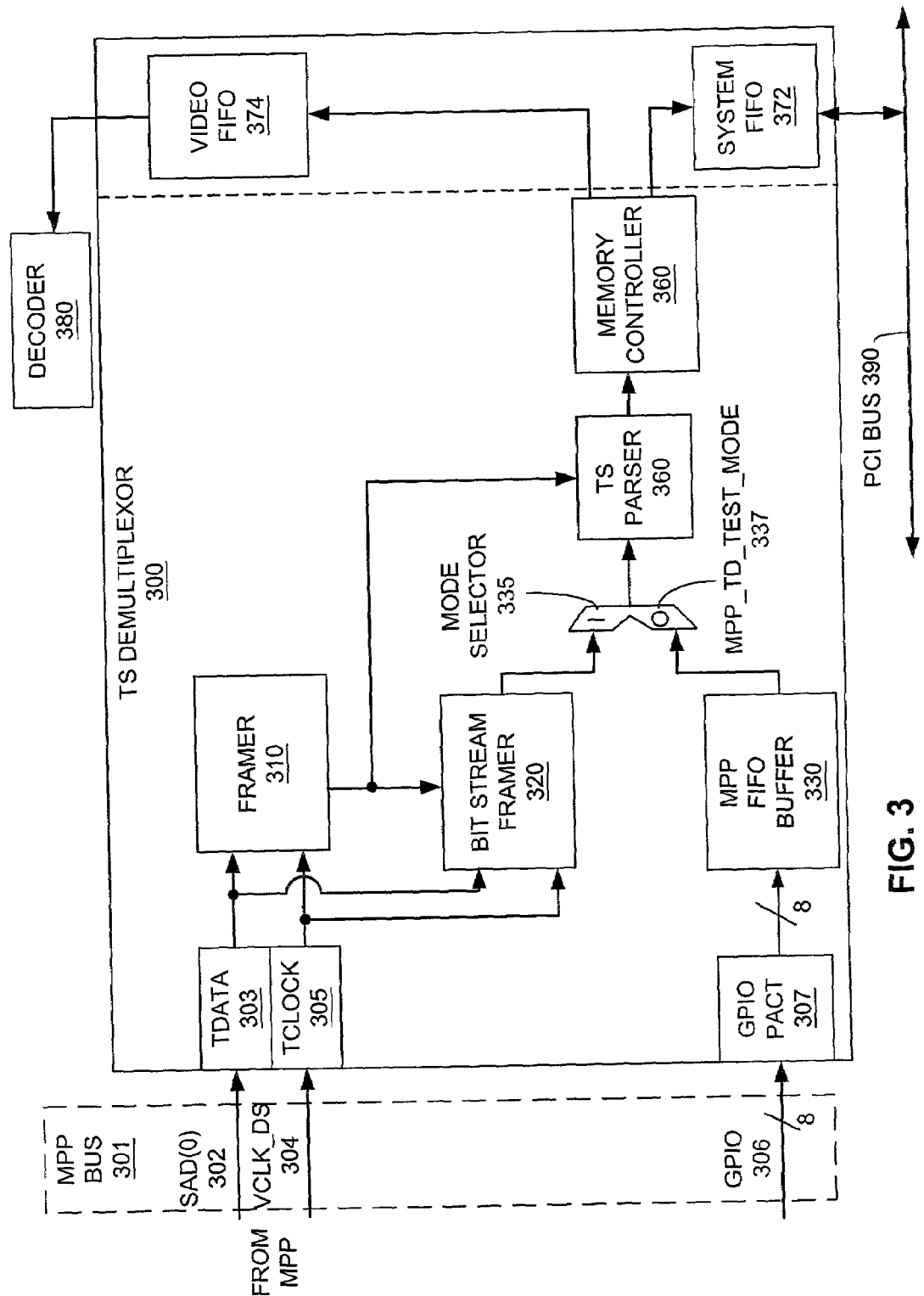
FIG. 3 is a block diagram illustrating internal components of a transport stream demultiplexer, according to one embodiment of the present invention.

Referring now to FIG. 3, a block diagram illustrating components of a TS demultiplexer 300 is shown, according to one embodiment of the present invention. TS demultiplexer 300 processes data from an MPP bus 301. In one embodiment, TS demultiplexer 300 processes the data into transport stream packets and elementary stream data to provide multimedia data for storage or to be decoded by decoder 380.

TS demultiplexer receives serial data associated with a transport stream file, such as TS file 146 (FIG. 1), through SAD(0) line 302 and VCLK_DS line 304 of MPP bus 301, through TDATA port 303 and TCLOCK port 305, respectively. The data is sent to a framer 310. In one embodiment, framer 310 is used to provide signals to a TS parser 360, indicating the start and end of particular data packets within a set of serial data or a transport stream. In one embodiment, the serial data provided through TDATA port 303 is in a byte format, in which data is sent serially in sets of bytes from an MPP controller, such as MPP port 200 (FIG. 2). To accommodate a transport stream format, a bit-stream framer 320 is used to convert the data from a byte format to a bit-stream format in which the data is sent as individual bits. The bit-stream generated through bit-stream framer 320 can be identified as belonging to individual packets through the signals provided by the framer 310.

Alternatively, a set of parallel data may be received through MPP bus 301, such as through GPIO lines 306. TS demultiplexer receives the parallel data through a GPIO port 307 and stores the data in an MPP FIFO buffer 330. Data from bit-stream framer 320 and MPP FIFO buffer 330 is sent to a mode selector 335. Mode selector 335 uses an indicator, such as MPP_TD_TEST_MODE indicator 337, to select between two modes of operation. In a first mode of operation, the data from the bit-stream framer 320 is selected and sent to a TS parser 360. In a second mode of operation, the data from MPP FIFO buffer 330 is selected and sent to TS parser 360. In one embodiment, TS parser 360 processes the selected data into TS packets. TS parser 360 may also select packets from the data related to a particular program. In one embodiment, TS parser 360 sends an indicator to an application, such as application 140, indicating the fullness of its memory buffers or the time elapsing between received sets of data. As previously discussed, the application may then suspend the transmission of data to allow the data to match a desired bit-rate or to avoid an overflow of FIFO buffers 330, 374, or 372.

Processed data related to system information, such as program association tables or program map tables may be stored in system FIFO buffer 372. Multimedia data, such as video data, may be stored in video FIFO buffer 374. In one embodiment, a decoder 380 further processes the multimedia data stored in video FIFO 374. Decoder 380 may process the multimedia data into video data to be presented through a display.

Referring now to FIG. 4, sets of tables are shown for configuring portions of an MPP port controller, such as MPP port 200 (FIG. 2), according to one embodiment of the present invention. In one embodiment, an application program may assert or monitor values of registers within the MPP port to monitor configurations of the MPP port.

MPP_GP_CONFIG register provides fields for determining control of the MPP port, such as enabling register-based streaming through MP_GP_ALT_REG_EN field. Furthermore, an MPP_GP_EN field is used to enable bus mastering by the MPP port. An MPP_CLK_CNTL register is used to provide control of the input clock used by the MPP port. For example, an MPP_CLK_FRACTION is used to provide a divider to be applied to the input clock to determine the output clock. An MPP_TD_PARALLEL field is used to select serial or parallel transmission to a TS demultiplexer. In one embodiment, the MPP_TD_PARALLEL field and the MPP_TDTEST_MODE field are redundant and setting the MPP_TDTEST_MODE field to send data using SAD lines indicates serial transmission. In an alternate embodiment, the MPP_TDTEST_MODE field is used to select sets of lines of the MPP bus related to either SAD lines or GPIO lines and the selection of whether one or all of those lines are used for serial or parallel transmission is determined through the settings of the MPP_TD_PARALLEL field.

An MPP_GP_ALT_REG_ADDR register is used to provide the address of a register from which to transmit data through the MPP bus. An MPP_GEN_STATUS register provides general status information. For example, a MPP_TD_RDY field indicates whether a receiving TS demultiplexer is ready for more data or is busy processing a current set of data.

An AMCGPIO_MASK register may be provided for determining whether select pins of the MPP bus will be used exclusively as a GPIO line or whether they will be used for different bus protocols, such as MPP, I2C, I2S, or a TS demultiplexer bus. An AMCGPIO_A_REG register provides status regarding GPIO input pins. An AMCGPIO register may be provided for writing data to the GPIO bus. An AMCGPIO_EN register may be provided to select individual pins of the GPIO bus as input or output pins.

Figure 5:
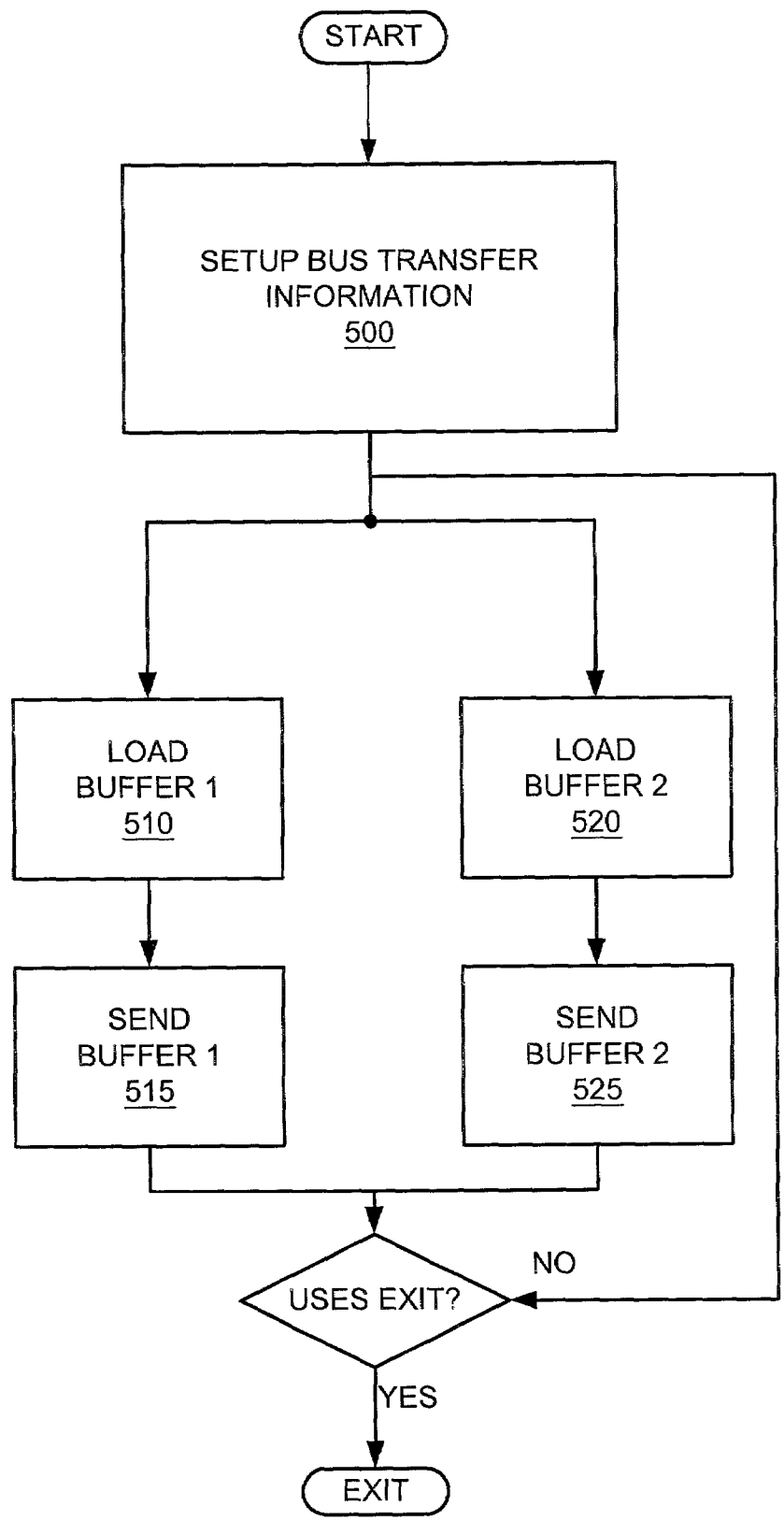
FIG. 5 is a flow diagram illustrating a method of providing data related to a transport stream file according to one embodiment of the present invention.

Referring now to FIG. 5, a flow diagram illustrating steps to initialize and transfer data from an MPP port is shown, according to one embodiment of the present invention. In one embodiment, an application program performs the steps described in FIG. 5 for transferring data through the MPP port to a TS demultiplexer.

In step 500, the application sets up the MPP bus transfer information. In one embodiment, setting up the MPP bus includes initializing memory pointers to buffers associated with the MPP port and setting pointers to portions of system memory including a TS file. The TS file may also be analyzed to determine a desired bit-rate. The data related to the TS file may be processed to determine a number of data bits between program clock references found in the data. The difference between consecutive program clock references may be used to determine a desired time in which the data should be sent. By dividing the data by the desired time, the desired bit-rate may be determined. The desired bit-rate may be compared to an actual transfer bit-rate to allow the application to adjust transmission to match the actual bit-rate to the desired bit-rate, as described further in reference to FIG. 6.

In step 510, data relating to the TS file is stored in a first buffer. In one embodiment, the method employed to load data into a buffer is as described in reference to FIG. 6. In step 515, the data in the first buffer is sent over the MPP port to the TS demultiplexer. In step 520, the next set of data related to the TS file is stored in a second TS buffer. In step 525, the data in the second buffer is sent to the TS demultiplexer. In the embodiment described in reference to FIG. 5, two buffers are used to optimize the storage and transmission of the data related to the TS file. It should be noted that other multiples of buffers might be used for transferring the data. The application can alternate between available buffers, keeping the system from having to wait for a buffer that is busy, being used to transmit data. Alternatively, a single buffer may be used.

Figure 6A:
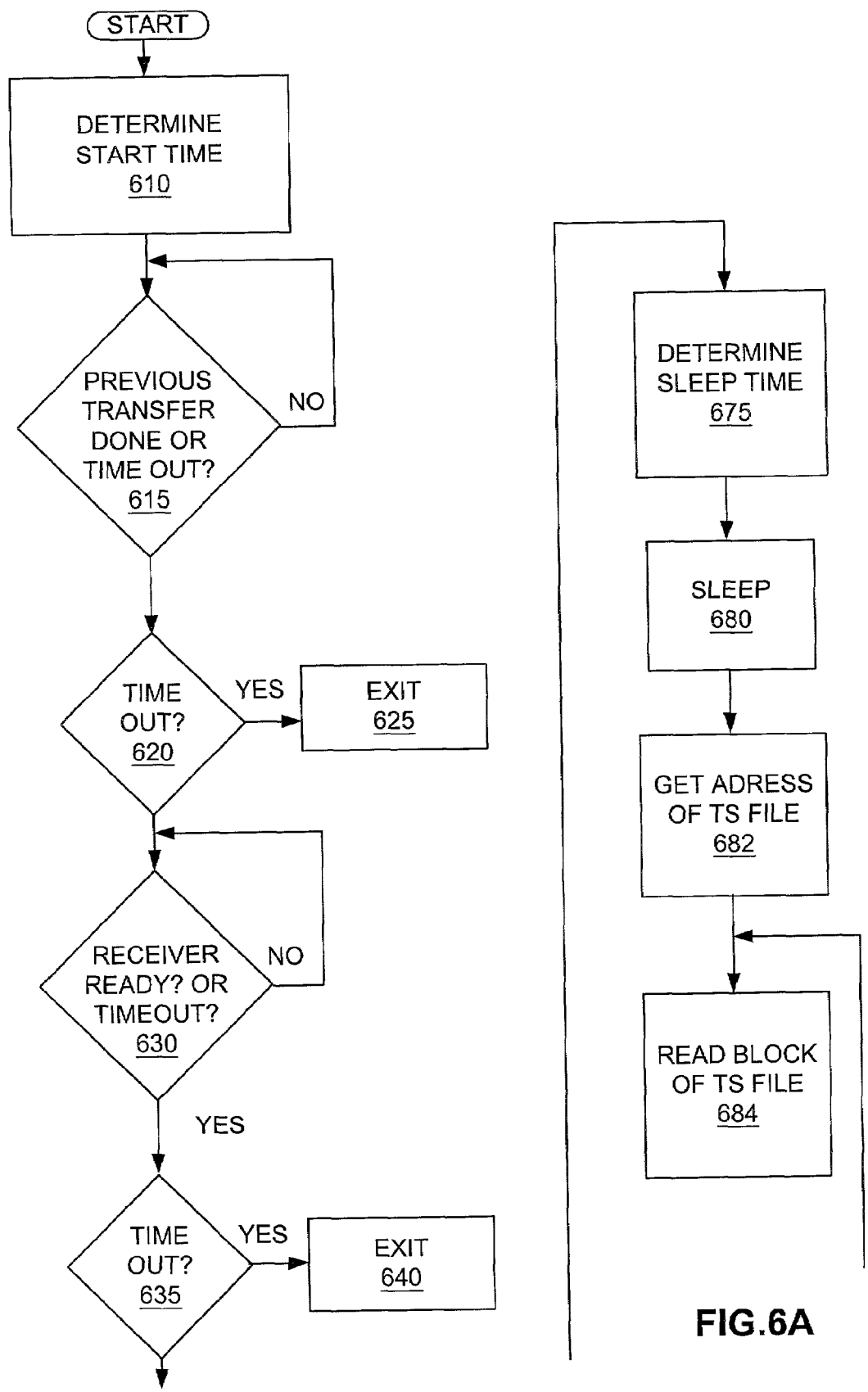
FIG. 6 is a flow diagram illustrating a method of transferring data related to a transport stream file to data buffers, according to one embodiment of the present invention.
Figure 6B:
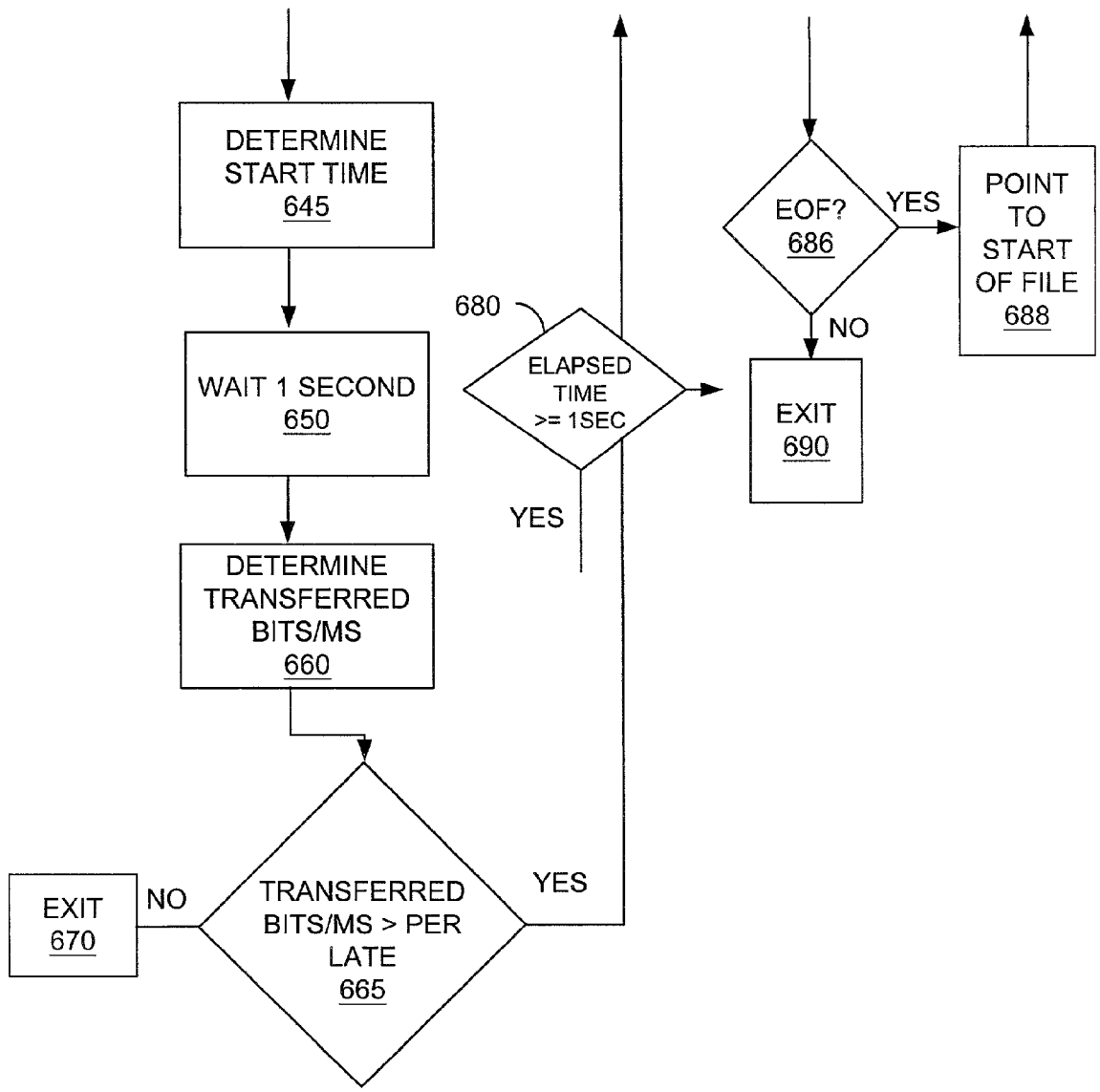

Referring now to FIG. 6, a flow diagram illustrating steps for handling the transmission of data to a TS demultiplexer is shown, according to one embodiment of the present invention. In one embodiment, data stored in MPP port buffers is transferred to the TS demultiplexer. In one embodiment, an application running in memory, or some other form of computer readable medium, includes instructions for performing the steps described in FIG. 6.

In step 610, a start time is determined. The start time may indicate a current value of a clock or counter associated with the MPP port or a system in which the MPP port is a part of. In step 615, it is determined if the previously initiated transfer has completed. If it is not done, the application waits until it is complete, allowing the transmission to be completed before attempting to send more data. The application waits until the transmission is complete or until a timeout condition is met. The current time from the counter is compared to the start time determined in step 610. If the time that passes while the application waits becomes too great, greater than a timeout value, the timeout condition is met and the application continues to step 620. Furthermore, if the transfer is complete, the application continues to step 620. In step 620, if the difference from the current time to the start time is greater than the timeout condition value, it is determined that a timeout occurred and, in step 625, the application exits, returning an error due to a timeout. Alternatively, if the timeout condition value was not met in step 620, the application continues to step 630.

In step 630, it is determined if the receiver is ready to receive data. If the receiver is not ready, the application waits until it is. The application checks the elapsed time in which it waits for the receiver to be ready. If the elapsed time meets the timeout value, the application stops waiting and proceeds to step 635. Furthermore, if the receiver becomes ready while in step 630, the application moves on to step 635. In step 635, it is determined if the timeout condition was met. If a timeout occurred, the application proceeds to step 640, where it exits and indicates a transmission error due to timeout. If the timeout did not occur, the application continues to step 645.

In step 645, the application determines a new start time, indicating the current time according to the counter. In step 650, the application allows a second to pass before attempting to adjust bit-rate. In step 660, the application determines the amount of data per unit time that was transmitted to the TS demultiplexer since the last transfer. The amount of data may be determined by monitoring the data that is remaining in the data buffer associated with the MPP port. In one embodiment, the MPP port provides an indicator of the amount of data transferred for the application. The time in which the TS demultiplexer receives the data may also be provided to the application to determine an average value of the number of bits per unit time transferred. The measurements of bits per unit time may be used to identify a current bit-rate. In step 665, the current bit-rate is compared to a desired bit-rate. The desired bit-rate is determined by data within the TS file, indicating a bit-rate in which the data should be sent to match transport stream transmission protocol. If the transferred, or current bit-rate is greater than the desired bit-rate, determined through program clock reference values, the application program continues to step 675. Otherwise, the application continues to step 670, where it exits, allowing the data to continue to be sent. In one embodiment, if data is sent too fast for the TS demultiplexer, buffers within the receiving TS demultiplexer trigger the application indicating adjustments need to be made to reduce the current bit-rate. In one embodiment, the current and desired bit-rates are calculated in bits per millisecond. In another embodiment, the current and desired bit-rates are calculated in bits per microsecond.

In step 675, a sleep time is calculated. In one embodiment, the sleep time is determined by the difference in time needed to send a block of data to allow the average bit-rate of the transmitted data to match the desired bit-rate. In step 680, the application suspends transmission of data for the duration of the calculated sleep time. In an alternate embodiment, the application program tracks an amount of data to suspend before proceeding to step 682. In step 682, the application gets the address of the start of the next block of data within the TS file. In step 684, the next block of data is read and stored in the current data buffer. In step 686, it is determined whether an end-of-file (EOF) indicator is read during the reading of the block of data. If the EOF indicator is found in step 686, the application continues to step 688, where the pointer is redirected to the start of the file, and the application continues to read data until it completes a block of data. A block of data indicates a predetermined size used to fill at least a portion of the current data buffer being used. In step 690, the application exits, allowing the data stored in the current buffer to be sent and allowing the next set of data to be loaded into the next buffer.

In one embodiment, a multimedia peripheral port (MMP) can be included as part of an advanced multimedia channel (AMC). A specific embodiment of an AMC, and portions of a specific embodiment of the MMP not specific the previous description are described below. Generally, the AMC is designed to support multiple protocols through the same physical layer that includes the graphics controller and connector/cable pin out. In addition to the previously described transport stream transfer mode, one embodiment of the AMC supports six additional modes:

VESA Feature Connector (VFC)
Digital Video Stream (DVS)
Multimedia Peripheral Port (MPP)
TV Output Mode (TVO)
Serial Control Bus (I2C)
Audio Mix Bus (AMB)

All modes except VFC can run concurrently.

The VFC interface is a subset of the AMC pin-out. It is used for connecting a graphics system to older video overlay boards that require VGA passthrough. Selection of VFC or non-VFC mode of operation is determined by the graphics BIOS at reset using the VFSENSE# pin. This pin is grounded by VFC peripherals, and is a no-connect for AMC peripherals. VFC mode is enabled when VFSENSE# is pulled low by the attached VFC peripheral. A VFC device and a non-VFC device may be daisy-chained on AMC with the restriction that the signals EVIDEO, EDCLK and ESYNC are not driven by the peripheral to the graphics controller while in any AMC mode. This restriction is necessary since older devices do not have VPM drivers; and it is up to the system integrator to ensure that it is adhered to.

When the AMC is operating in DVS mode, the interface is configured as a synchronous input port, through which clock signals and data flow from the video or MPEG decoder into the graphics controller. This allows graphics controllers to be directly connected to decoders such as the Brooktree BT829 with embedded sync signals. Connection to a video or MPEG decoder such as the Philips SAA7110/7111 or CL450, using HSYNC and VSYNC pins, is also supported, but additional logic to encode the synchronization information within the data stream is required.

In general, use of VFC based overlay devices will result in lower quality output, because the VFC, released in 1985, was specified for 640×480 resolution, 60 Hz refresh rate, 256 colors and a 25 MHz pixel clock. Today's user expects higher color depths, resolutions, refresh rates, and pixel clocks over 200 MHz. These are all within AMC's capabilities. The VFC operates by passing an 8 bit palletized signal out of the graphics card into an overlay card. The overlay shadows the graphics palette RAM, recreate the graphics signal, synchronize the overlay video to the graphics video, and then mix and display the two signals on the screen. This mode breaks down when color depths exceed 8 bits, and pixel clocks exceed 40 MHz—in other words, this mode is inoperable in today's standards. The VFC ribbon cable system simply cannot pass today's high frequency graphics signals.

The DVS port operates by having the video device pass its YUV422 video into the graphics card at the video device's slower native speed. The video signals are always at a low frequency (27–35 MHz) which the AMC/VFC cable can handle reliably. The video device is not required to synchronize with the graphics device, or have any knowledge of the graphics mode. The high-speed graphics signals stay contained in the graphics chip.

In one embodiment MPP mode uses an 8-bit address/data bus, plus three control pins to provide a host interface for a range of peripheral devices such as MPEG decoders or audio processors. The fully programmable control signals allow it to interface to a variety of devices with minimal external glue logic. The MPP port has two main data modes:

Streaming mode, which supports burst writes. The two control lines are used as an address and data strobes. This mode allows much higher bandwidth of burst access that the ISA mode.

ISA mode, which supports byte writes only. The two control lines are used as write and read strobes, similar to ISA.

AMC 2.0 graphics controllers use the MPP SAD[0–7] lines to send data for TV output functions. If TV Out is enabled during the active graphics display time, SAD[0–7] will toggle at speeds up to 1000 MHz. The control lines IOR#/ALE and IOW#/DS# will not be active during this time, so MPP devices can ignore this activity.

MPP peripherals should be designed to make sure they are not "upset" by high speed activities on the SAD [0–7] lines, when the control lines are inactive. Due to the high speed characteristics of the ribbon cable, SAD[0–7] may not be at TTL levels during this time.

The MPP bus is a high performance 8-bit addressable bus that may be used to connect several devices to the graphics controller. It can do individual reads and write, as well as perform high speed bus mastered transfers from the PCI bus to any of the devices. If handshaking is used during burst writes, no AMC device will be able to request and interrupt during bus mastered bursts. Handshaking cannot be used during burst writes with TVOUT, because it would imply that an MPP cycle can be extended into the active display region.

The MPP bus includes the following signals:

| | | |
|---|---|---|
| SAD(7:0) | I/O | Multiplexed 7-bit address, 8-bit data bus. |
| SIOR | O | AS Address Strobe MPP addresses are latched on the falling edge of AS |
| SIOW | O | DS Data Strobe MPP data is latched on the rising edge of DS |
| SRDY | I | Ready/Request/Interrupt |

During address transfer, SAD(6:0) is the 7-bit address, and SAD(7) is R/W signal. During data transfer, this is an 8-bit bi-directional data bus.

SRDY is active high Ready/Request handshaking during MPP bus cycles. Active low open-collector interrupt request line between MPP bus cycles.

A basic read cycle is defined by:

MPP port places address on bus, with SAD(7) high, indicating a read cycle.

MPP port asserts AS low. The peripheral should latch the address on the falling edge of AS.

MPP port asserts DS low, and tri-states SAD(7:0)

MPP device drives data on MPP Bus, and de-asserts SRDY (if asserted)

MPP port de-asserts DS and AS

MPP device tri-states its data output and SRDY (if driven)

A basic write cycle is defined by:

MPP port places address on bus, with SAD(7) low, indicating a read cycle.

MPP port asserts AS low. The peripheral should latch the address on the falling edge of AS.

MPP port asserts DS low, after this time, the MPP device can drive the SRDY line MPP port drives data on MPP Bus MPP device de-asserts SRDY line (if asserted)

MPP port de-asserts DS and AS

MPP device tri-states its data output and SRDY (if driven)

During a basic MPP read/write cycle, the SRDY line may be used by slow MPP devices to extend the cycle—if the target MPP device cannot service the cycle, it drives SRDY low as soon as it senses DS low. The MPP port will wait until SRDY is high before completing the cycle.

The MPP Burst-Write mode allows a data stream to be written to a single MPP address in a highly efficient manner—the MPP address is sent only once at the beginning of the burst, therefore the throughput using this mode is over twice that of regular MPP writes. This mode is useful for sending high-bandwidth data (such as MPEG-2 streams) to MPP devices that have on-chip FIFOs. The Burst-Write characteristics are:

The SRDY line can be used as a "request" signal by the MPP target device.

All MPP burst writes begin with a header cycle, followed by one or more byte write cycles, finishing off with a footer cycle.

The header cycle is used to set the address of the target MPP Device. No data is written during this cycle. Notice that the AS line remains low until the end of the footer cycle. This indicates that all writes during this period are to the same address specified in the header cycle. After AS goes low, the target should drive the SRDY (request) line. While AS is low, only the target may drive the SRDY line; therefore, no interrupts can be asserted by any MPP device during MPP burst-write cycles.

When the target is ready to accept data, it should drive the SRDY (request) line high.

When the MPP Port senses SRDY asserted high (and it has write data in its buffer), it initiates a byte transfer cycle. The target can de-assert SRDY after it senses the DS line go low. The target must allow for up to two more byte writes after it de-asserts SRDY.

After all data have been transferred to the target device, the MPP Port initiates a footer cycle. The main purpose of this cycle is to assert ALE, causing the target device to release the SRDY line. This cycle is only necessary if the SRDY line is being used as an interrupt line as well.

In Burst-Write mode the SRDY line is used as a data request signal. An MPP data cycle will not start until it gets a request from the target device via the SRDY line. Because the target device request can occur in parallel with the MPP data cycles, the rate at which data can be transferred is speeded up considerably. Using SRDY, MPP devices may extend MPP cycles to a maximum of 60 ns.

The SRDY line can also be used as an interrupt line allowing any MPP device to signal the graphics controller. The host can poll to determine when an MPP interrupt is active, or alternatively the controller can be programmed to automatically generate a PCI interrupt whenever it receives an MPP interrupt. A simple hardware protocol for determining whether the SRDY line is being used for handshaking or to signal a valid interrupt can be based on the following:

When an MPP bus cycle is occurring, the SRDY line is used for handshaking.

When no MPP bus cycle is occurring, the SRDY line is used as an interrupt request. Then, external MPP devices must follow these rules:

When no MPP bus cycles are occurring (i.e. AS is high), the SRDY line is used as an open-collector, level-sensitive active-low interrupt line. An external 47 ohm resistor pulls SRDY high. Whenever an MPP device needs to send an interrupt, it pulls SRDY low. Any number of devices can pull this line low simultaneously.

When a MPP bus cycle is initiated (i.e. AS goes low), any MPP device that is requesting an interrupt needs to release the SRDY line. It can only reassert its interrupt request after the end of the MPP bus cycle (i.e. AS is high).

An MPP device can only assert SRDY (for bus handshaking) during an MPP bus cycle.

At the end of it, the target device needs to immediatel disconnect its READY signal from the SRDY line.

The MPP port logic regards the SRDY line as having a valid interrupt—it will begin to ignore SRDY as soon as AS goes low, and it will continue to ignore SRDY for two clock cycles (roughly 31 ns) after AS has gone high. This gives the last accessed MPP device enough time to tri-sate its ready line.

In one embodiment, the MPP bus does not support any form of interrupt vectors. Once an interrupt has occurred, it is the responsibility of the host software to poll each MPP device capable of issuing an interrupt to determine where the interrupt originated. Since no interrupts are possible during MPP burst writes, this may result in a very long interrupt latency when large data (such as compressed MPEG) streams are being transferred across the MPP bus. This is especially true for MPEG transfer in TVO configurations where the MPP bus is shared with TVO data—the interrupt latency could reach up to hundreds of milliseconds.

In one embodiment, the bandwidth available on MPP allows for an MPEG data transfer rate of over 10 Mbytes/sec. Here is a list of supported modes of operation:

Basic Byte Write.
Basic Byte Read.
Basic DWORD Write.
Basic DWORD Read.
Burst-Write Header.
Burst-Write Footer.
Bus-Mastered Burst-Write with SRDY line used as transfer request.
Bus-Mastered Basic DWORD Write In an embodiment where the MPP port is implemented as a state machine that runs off the graphics controller's GUI Engine clock (MCLK). The speed and throughput of the MPP port is determined by the speed of this clock, which can be anywhere from 55 MHz to 80 MHz, and beyond. For this reason, MPP operations are expressed in terms of MCLK periods. The length of MPP operations are:
 9 MCLK cycles per byte for Basic MPP Read or Write:
 4 MCLK cycles per byte for MPP Burst-Write:

Considering MPP burst writes coupled with PCI-Bus-Mastered operation, this gives the highest possible throughput. Bus-Mastered writes through the MPP port occur in 16-byte bursts. The MPP port first requests a bus-mastering read of up to 16 bytes to fill its internal (MPP) buffer. After time t1 (PCI latency), the PCI bus responds by starting to transfer a burst of 16 bytes. After time t2 (time needed for internal resynchronization), the MPP port senses valid bytes in its internal buffer and starts to write the burst onto the MPP bus. Once valid bytes are in the buffer, the MPP will not request another PCI bus-master transfer until the MPP buffer is empty, i.e., the burst has been completely written out to the MPP bus (after time t3).

The data transfer rate of the MPP port without TVO transmission for a system with a typical PCI latency (t1) of 17 PCI clocks (30 ns period), and an MCLK frequency of 64 MHz (15 ns period) can be determined by the equation:

$$16/(t1+t2+t3)=16/((17*30\text{ ns})+(4*15\text{ ns})+(64*15\text{ ns}))$$
$$=10.5 \text{ MBytes/sec}$$

For the previous system, the sustained MPP data transfer rate without TVO was calculated to be 10.5 Mbytes/sec, which is approximately 8 times the stipulated basic MPEG-2 data rate. With TVO in 640×480 VGA mode, the MPP bandwidth would be 35% of that without TVO. In other words, the data rate would be $$10.5 \text{ Mbytes/s} * 0.35 = 3.6 \text{ MBytes/sec}$$

which is still higher than that stipulated for MPEG-2.

The tables listed below represent a specific embodiment of a register set that can be used to support features of the MPP bus not specifically covered in the embodiment described previously.

MPP_GP_CONFIG

| Field Name | Bits | Default | Description |
| --- | --- | --- | --- |
| MPP_GP_PRESCALE | 2:0 | 0x0 | This slows down the MPP state machine by a programmable ratio-number of MCLK cycles per state in the state generator:<br>0 = Divide by 1<br>1 = Divide by 2<br>2 = Divide by 3<br>3 = Divide by 4<br>4 = Divide by 5<br>5 = Divide by 6<br>6 = Divide by 7<br>7 = Divide by 8 |
| MPP_GP_N_STATES | 5:4 | 0x0 | This specifies the number of states the MPP state machine goes through to finish a data cycle. 0x3 is usually used for register accesses, while 0x2 is used for FIFO transfer.<br>0 = reserved<br>1 = 2 states<br>2 = 4 states<br>3 = 8 states |
| MPP_GP_FORMAT | 7:6 | 0x0 | This defines the MPP cycle format. Format 0x2 is generally used for register accesses, while 0x0 is used for FIFO transfer.<br>0 = 8-bit data<br>1 = 16-bit data<br>2 = 8-bit addr, 8-bit data<br>3 = 16-bit addr, 16-bit data |
| MPP_GP_WAIT_STATE | 10:8 | 0x0 | This specifies the wait state.<br>If MPP_GP_CHK_RDY_EN is on, the MPP state machine will sample the SRDY line in the state specified in this field to determine whether the state machine should get into wait state. |
| MPP_GP_CHK_RDY_EN | 11 | 0x0 | This field enables the sampling of SRDY, the MPP state machine will be suspended if the SRDY indicates not RDY.<br>0 = Disable<br>1 = Wait for RDY high |
| MPP_GP_INSERT_WAIT | 12 | 0x0 | This will extend the wait state by 1 extra cycle.<br>0 = Normal<br>1 = Extend wait by 1 cycle |
| MPP_GP_TRISTATE_ADDR | 13 | 0x0 | Address control during read cycle<br>0 = Normal<br>1 = Tristate during read |
| MPP_GP_TVO_EN | 14 | 0x0 | Turn on this bit to allow TVO data to go through MPPGP<br>0 = Disable<br>1 = Enable |
| MPP_GP_READ_EARLY | 15 | 0x0 | This causes the read data to be latched in one state earlier.<br>0 = Normal<br>1 = Latch data on reads 1 state earlier |

-continued

MPP_GP_CONFIG

| Field Name | Bits | Default | Description |
|---|---|---|---|
| MPP_GP_RW_MODE | 17:16 | 0x0 | 0x3 will be used most, the MSB (most significant bit) of the address indicates read/write, while STB0 = Data Strobe and STB1 = Address Strobe<br>0 = R = W<br>1 = R = STB1, W = STB0<br>2 = STB1 = Data Strobe, STB0 = Write Strobe<br>3 = MSB_ADDR = 0 during write, 1 during read |
| MPP_GP_INT_MASK | 19:18 | 0x0 | The one that will be mostly used is 0x1, interrupts are valid only when the MPP bus is idle.<br>0 = Interrupts always valid(i.e. RDY pin is not used)<br>1 = Interrupts valid when MPP_RDY = ready<br>2 = Interrupts are valid when STB0 = 1<br>3 = Interrupts valid when both STB1/STB2 are high |
| MPP_GP_AUTO_INC_EN | 21:20 | 0x0 | 0 = No auto-increment.<br>1 = Reserved.<br>2 = Full Auto-increment entire address<br>3 = LS 2-bit Auto-increment and wrap. |
| MPP_GP_CHK_REQ_EN | 22 | 0x0 | Enabling this field means the MPP will sample the SRDY as a request signal from the slave right before the cycle starts. If this field is enabled, the MPP cycle will be initiated only when SRDY state is at MPP_GP_CHK_REQ_MODE.<br>0 = Normal<br>1 = Initiate MPP cycles when RDY state is at MPP_CHKREQ_MODE |
| MPP_GP_CHK_REQ_MODE | 23 | 0x0 | 0 = RDY low<br>1 = RDY high |
| MPP_GP_BUFFER_SIZE | 25:24 | 0x0 | 0x0 for 8/16 bits register read/write cycles<br>0x1 reserved<br>0x2 reserved<br>0x3 for FIFO transfer<br>0 = Disable buffer, i.e. only single 8/16 bit reads or writes are done<br>3 = Enable buffer. Buffer is 4 DWORDS deep |
| MPP_GP_BUFFER_MODE | 27:26 | 0x0 | 0x0: Normal mode (no bus mastering)<br>0x1: Read pre-fetch buffer mode (MPP always initiates read cycle when the buffer is empty)<br>0x2: Bus master write (System -> MPP Transfer)<br>0x3: Bus master write (MPP -> System transfer)<br>0 = Normal<br>1 = Read buffer pre-fetch<br>2 = Bus Master Write<br>3 = Bus Master Read |
| MPP_GP_TVO_VBLANK_ONLY | 28 | 0x0 | 0 = Allow MPP access during Hblank and Vblank<br>1 = Allow MPP access only during Vblank |
| MPP_GP_TVO_OVERRIDE_EN | 29 | 0x0 | 0 = Normal<br>1 = Override MPP function for TV out |
| MPP_GP_BUS_PWR_DOWN_AK (as write bit) | 30 | 0x0 | Clear PWM_DOWN bit with a '1'. In order to support PCICLK power down mode, it is important to clear this bit every time there is an interrupt from the MPP device.<br>0 = Normal<br>1 = Let the host bus to go back to power down state. |
| MPP_GP_BUS_PWR_DOWN (as read bit) | 30 | 0x0 | 0 = Normal<br>1 = wake up PCICLK if it has been stopped during power down mode<br>0 = Normal<br>1 = STARTUP PCICLK |

MPP_GP_STROBE_SEQ

| Field Name | Bits | Default | Description |
|---|---|---|---|
| STB_GP_0_SEQ | 7:0 | 0x0 | This field defines the strobe sequence of STB0, which is the data strobe (DS). |
| STB_GP_1_SEQ | 15:8 | 0x0 | This field controls the strobe sequence of STB1, which is the address strobe (AS). |
| (reserved) | 31:16 | | |

MPP_GP_ADDR

| Field Name | Bits | Default | Description |
|---|---|---|---|
| MPP_GP_AD | 15:0 | 0x0 | This field specifies the destination address of the upcoming transfer-address in peripheral device to write data. Reading from this register indicates the next bus address to be used.<br>Only the lower 2 bytes are used, and no byte read/write on the upper 2 bytes |
| (reserved) | 31:16 | | |

MPP_GP_DATA

| Field Name | Bits | Default | Description |
|---|---|---|---|
| MPP_GP_DT | 31:0 | 0x0 | The data port for MPPGP - the data will be written or read from the MPP buffer. |

The systems described herein may be part of an information handling system. The term "information handling system" refers to any system that is capable of processing information or transferring information from one source to another. An information handling system may be a single device, such as a computer, a personal digital assistant (PDA), a hand held computing device, a cable set-top box, an Internet capable device, such as a cellular phone, and the like. Alternatively, an information handling system may refer to a collection of such devices. It should be appreciated that while components of the system have been describes in reference to video processing components, the present invention may be practiced using other types of system components. It should be appreciated that the system described herein has the advantage of providing cost effective equipment for generating a transport stream, without the need of a separate dedicated operating system or hardware.

In the preceding detailed description of the embodiments, reference has been made to the accompanying drawings which form a part thereof, and in which is shown by way of illustration specific embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit or scope of the invention. To avoid detail not necessary to enable those skilled in the art to practice the invention, the description may omit certain information known to those skilled in the art. Furthermore, many other varied embodiments that incorporate the teachings of the invention may be easily constructed by those skilled in the art. For example, a different embodiment of the present invention could use the SAD(0) line to transmit serial data to a demultiplexor, while the SAD(7..0) lines could transmit parallel data to the demultiplexor, instead of using available GPIO lines. Accordingly, the present invention is not intended to be limited to the specific form set forth herein, but on the contrary, it is intended to cover such alternatives, modifications, and equivalents, as can be reasonably included within the spirit and scope of the invention. The preceding detailed description is, therefore, not to be taken in a limiting sense, and the scope of the present invention is defined only by the appended claims.

What is claimed is:

1. A method comprising:
   reading data from a file;
   setting a transmit bit-rate to a first bit-rate;
   sending a transport stream based on the data to a demultiplexer at the transmit bit-rate;
   determining a number of transmitted bits between two program clock references in a common program stream, wherein the program clock references are read from the transport stream;
   determining a desired elapsed time between the two program clock references;
   determining a desired bit-rate based on the desired elapsed time and the number of transmitted bits; and
   setting the transmit bit-rate to the desired bit-rate.

2. The method as in claim 1, wherein the transmit bit-rate is determined by calculating an average number of bits associated with the transport stream sent to the demultiplexer per unit time.

3. The method as in claim 1, wherein the common program stream is determined by parsing program stream information tables to determine a program identifier of a particular program stream.

4. The method as in claim 1, wherein the common program stream is determined by parsing program map tables to determine a program identifier of a particular program stream.

5. The method as in claim 1, wherein setting the transmit bit-rate to the desired bit-rate includes indicating that transmission of a portion of the transport stream should be delayed.

6. A system comprising:
   means for reading data from a file;
   means for setting a transmit bit-rate to a first bit-rate;
   means for sending a transport stream based on the data to a demultiplexer at the transmit bit-rate;
   means for determining a number of transmitted bits between two program clock references in a common program stream, wherein the program clock references are read from the transport stream;
   means for determining a desired elapsed time between the two program clock references;
   means for determining a desired bit-rate based on the desired elapsed time and the number of transmitted bits; and
   means for setting the transmit bit-rate to the desired bit-rate.

7. The system of claim 6, wherein the transmit bit-rate is determined by calculating an average number of bits associated with the transport stream sent to the demultiplexer per unit time.

8. The system of claim 7, wherein the common program stream is determined by parsing program stream information tables to determine a program identifier of a particular program stream.

9. The system of claim 7, wherein the common program stream is determined by parsing program map tables to determine a program identifier of a particular program stream.

10. The system of claim 7, wherein setting the transmit bit-rate to the desired bit-rate includes indicating that transmission of a portion of the transport stream should be delayed.

* * * * *